(12) United States Patent
Levi et al.

(10) Patent No.: US 6,813,582 B2
(45) Date of Patent: Nov. 2, 2004

(54) NAVIGATION DEVICE FOR PERSONNEL ON FOOT

(75) Inventors: Robert W. Levi, Anaheim, CA (US); Robert R. Marshall, Walnut, CA (US)

(73) Assignee: Point Research Corporation, Fountain Valley, CA (US)

( * ) Notice: Subject to any disclaimer, the term of this patent is extended or adjusted under 35 U.S.C. 154(b) by 0 days.

(21) Appl. No.: 10/627,280

(22) Filed: Jul. 25, 2003

(65) Prior Publication Data

US 2004/0064286 A1 Apr. 1, 2004

Related U.S. Application Data

(60) Provisional application No. 60/399,912, filed on Jul. 31, 2002.

(51) Int. Cl.[7] .............................................. G06F 15/00
(52) U.S. Cl. ...................................... 702/141; 701/217
(58) Field of Search .......................... 702/141; 701/217, 701/213; 340/573.1

(56) References Cited

U.S. PATENT DOCUMENTS

| | | |
|---|---|---|
| 2,091,964 A | 9/1937 | Carter |
| 3,583,074 A | 6/1971 | Baker et al. |
| 4,031,630 A | 6/1977 | Fowler |
| 4,143,467 A | 3/1979 | Erspamer et al. |
| 4,347,730 A | 9/1982 | Fisher et al. |
| 4,611,293 A | 9/1986 | Hatch et al. |
| 4,622,646 A | 11/1986 | Waller et al. |
| 4,656,750 A | 4/1987 | Pitt et al. |
| 4,809,007 A | 2/1989 | Hassenplug |
| 4,851,775 A | 7/1989 | Kim et al. |
| 4,887,081 A | 12/1989 | Iihoshi et al. |
| 4,991,126 A | 2/1991 | Reiter |
| 5,067,083 A | 11/1991 | Nakayama et al. |
| 5,115,238 A | 5/1992 | Shimizu et al. |
| 5,122,960 A | 6/1992 | Ooka |

(List continued on next page.)

OTHER PUBLICATIONS

Ladetto, Quentin, et al., "Combining Gyroscopes, Magnetic Compass and GPS for Pedestrian Navigation", date unknown, Geodetic Engineering Laboratory, Institute of Geomatics, Swiss Institute of Technology, 8 pg.

Ladetto, Quentin, " On Foot Navigation: Continuous Step Calibrations Using Both Complementary Recursive Prediction and Adaptive Kalman Filtering", date unknown, Geodetic Laboratory, Institute of Geomatics, Swiss Federal Institute of Technology, 6 pg.

Gabaglio, Vincent et al.., "Real–Time Calibration of LEngth of Steps with GPS and Accelerometers", Swiss Federal Institute of Technology, Geodetic Engineering Laboratory , 6 pg.

Ladetto, Quentin et al. , "Digital Magnetic Compass and Gyroscope Integration for Pedestrian Navigation", Faculte ENAC, Institut du Developpment Territorial, Geodetic Laboratory, 10 pg.

*Primary Examiner*—John Barlow
*Assistant Examiner*—Xiuqin Sun (57) ABSTRACT

Performing dead reckoning navigation for persons on foot with improved accuracy. Accelerometers in a navigation device are used to deduce when abnormal steps are being taken and modify navigation calculations accordingly. Running and walking sideways or backwards are among the situations which can be detected and compensated. One embodiment of the invention is a pedometer which is attached to the user's waist or torso. Various correlations are used to distinguish between running versus walking, forward steps versus backward steps, left turn versus right turn, and the slope of the terrain being traveled. Various algorithms are used to distinguish between such motions and accurately track the distance and direction traveled.

20 Claims, 7 Drawing Sheets

U.S. PATENT DOCUMENTS

| | | |
|---|---|---|
| 5,235,514 A | 8/1993 | Matsuzaki |
| 5,239,264 A | 8/1993 | Hawks |
| 5,287,295 A | 2/1994 | Ives et al. |
| 5,287,297 A | 2/1994 | Ihara et al. |
| 5,287,628 A | 2/1994 | Yamaguchi et al. |
| 5,297,050 A | 3/1994 | Ichimura et al. |
| 5,319,561 A | 6/1994 | Matsuzaki |
| 5,327,348 A | 7/1994 | Kato |
| 5,331,563 A | 7/1994 | Masumoto et al. |
| 5,404,307 A | 4/1995 | Odagawa |
| 5,424,953 A | 6/1995 | Masumoto et al. |
| 5,428,902 A | 7/1995 | Cheah |
| 5,488,788 A | 2/1996 | Durbin |
| 5,583,776 A | 12/1996 | Levi et al. |
| 5,935,191 A | 8/1999 | Sakanashi et al. |
| 5,956,660 A | 9/1999 | Neumann |
| 5,986,583 A | 11/1999 | Nakano et al. |
| 6,018,705 A | 1/2000 | Gaudet et al. |
| 6,032,099 A | 2/2000 | Fernandez |
| 6,052,654 A | 4/2000 | Gaudet et al. |
| 6,067,046 A | 5/2000 | Nichols |
| 6,081,230 A | 6/2000 | Hoshino et al. |
| 6,122,960 A | 9/2000 | Hutchings et al. |
| 6,132,391 A | 10/2000 | Onari et al. |
| 6,145,389 A | 11/2000 | Ebeling et al. |
| 6,175,608 B1 | 1/2001 | Pyles et al. |
| 6,204,807 B1 | 3/2001 | Odagiri et al. |
| 6,243,660 B1 | 6/2001 | Hsu et al. |
| 6,282,496 B1 | 8/2001 | Chowdhary |
| 6,298,314 B1 | 10/2001 | Blackadar et al. |
| 6,301,964 B1 | 10/2001 | Fyfe et al. |
| 6,305,221 B1 | 10/2001 | Hutchings |
| 6,366,855 B1 | 4/2002 | Reilly et al. |
| 6,408,251 B1 | 6/2002 | Azuma |
| 6,415,223 B1 | 7/2002 | Lin et al. |
| 6,513,381 B2 | 2/2003 | Fyfe et al. |
| 6,522,266 B1 | 2/2003 | Soehren et al. |
| 6,546,336 B1 * | 4/2003 | Matsuoka et al. .......... 701/213 |
| 2001/0045128 A1 | 11/2001 | McCall et al. |
| 2002/0040601 A1 | 4/2002 | Fyfe et al. |
| 2002/0089425 A1 * | 7/2002 | Kubo et al. .............. 340/573.1 |
| 2002/0091482 A1 | 7/2002 | Eakle, Jr. et al. |
| 2002/0111717 A1 | 8/2002 | Scherzinger et al. |
| 2002/0128775 A1 | 9/2002 | Brodie et al. |
| 2002/0143491 A1 | 10/2002 | Scherzinger |
| 2003/0018430 A1 * | 1/2003 | Ledetto et al. .............. 701/217 |

* cited by examiner

NAVIGATION DEVICE FOR PERSONNEL ON FOOT

CROSS REFERENCE TO RELATED APPLICATIONS

This non-provisional United States (U.S.) patent application claims the benefit of U.S. Provisional Application No. 60/399,912 filed on Jul. 31, 2002 by inventors Robert W. Levi and Robert R. Marshall, titled "Navigation Device for Personnel on Foot."

STATEMENT REGARDING FEDERALLY SPONSORED RESEARCH OR DEVELOPMENT

This invention was originated as part of a Federally sponsored Small Business Innovation Research (SBIR) project, contract number DAMD17-99-C-9028. The contractor is Point Research Corporation, 17150 Newhope Street, Suite 709, Fountain Valley, Calif. 92708. Patent rights for this invention are subject to the Federal Acquisition Regulations (FAR) paragraph 52.227-20—Rights in Data—SBIR Program, and DFARS 252.227-7018 Rights in Noncommercial Technical Data and Computer Software—Small Business Innovation Research (SBIR).

FIELD

Various embodiments of the invention pertain to navigation systems. More particularly, at least one embodiment of the invention relates to a device, system, and method for dead reckoning navigation for a person on foot.

DESCRIPTION OF RELATED ART

A pedometer is a device for counting footsteps and has been in use for some time to assist in determining distance traveled by persons on foot. The usefulness of a pedometer depends on knowing the length of each footstep, or the "stride", and the assumption that the direction of travel is straight ahead. A person's walk or stride typically varies in response to a number of circumstances, including, but not limited to, walking sideways or backwards, and going uphill or downhill. Stride changes even more drastically if a person runs instead of walks.

If a pedometer is used in conjunction with a device to determine direction of travel, such as a magnetic compass, navigation by dead reckoning is possible. For example, the system described in U.S. Pat. No. 5,583,776 uses stride data from a pedometer combined with compass data. However, that device does not compensate for non-forward walking motions.

Dead reckoning permits knowing the user's location with respect to some known reference, such as his starting point. When determining position of the user by dead reckoning techniques, unusual walking motions introduce errors if a person steps sideways or backwards as, for example, a soldier may need to do to evade an enemy or obstacle. In these cases, the direction of travel may differ from the direction the user is facing, which is the direction that would be reported by a compass attached to the person's torso.

Thus, prior art dead reckoning systems typically fail to accurately account for non-forward walking motions and changes in stride length.

U.S. Pat. Nos. 6,305,221 and 6,301,964 describe dead reckoning navigations systems and methods in which accelerometers are mounted on the user's foot or leg. It is theoretically possible to measure a user's motion directly by double integration of acceleration with time, but currently available accelerometers severely limit the accuracy of this method when the accelerometers are mounted on or near a user's waist. Where the information to be integrated is much smaller than gravity, typical accelerometer components are distorted by gait rotations and other sources of noise. This is the reason prior art dead reckoning navigation systems specify mounting the accelerometers on a user's foot or extremities, where the acceleration magnitudes are greater.

However, mounting the accelerometers around a user's foot or extremities, and the need to communicate results from the accelerometers by wire or radio transmission methods, is subject to other sources of error, is less convenient, potentially more expensive and sometimes impractical.

DETAILED DESCRIPTION

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

A first aspect of an embodiment of the invention improves the accuracy and usefulness of dead reckoning navigation for a person on foot by exploiting additional information from accelerometers provided for leveling and step determination. The additional information permits deducing a variety of walking motions and adjusting dead reckoning navigation calculations to improve the accuracy of the navigation.

A second aspect of an embodiment of the invention also anticipates using altitude data from a barometric altimeter as part of the calculations to estimate variations in stride when walking uphill, downhill or on stairs.

One implementation of the invention provides an electronic dead reckoning device that can be mounted on the user's waist. The electronic dead reckoning device contains sensors for measuring the direction that the user is facing, in addition to sensors for measuring acceleration in three orthogonal axes. Since the earth's magnetic field is not generally horizontal, but the direction of magnetic north is the component of that field in the horizontal plane, accelerometers, which also respond to gravity, are included to determine and/or correct for tilting.

The same accelerometers can also serve to implement the navigation functions of a pedometer. Generally, data available from the accelerometers is used by a novel algorithm to deduce non-forward walking and improve the accuracy of personal dead reckoning positioning by estimating changes in the length and/or relative direction of the user's stride.

Figure 1:
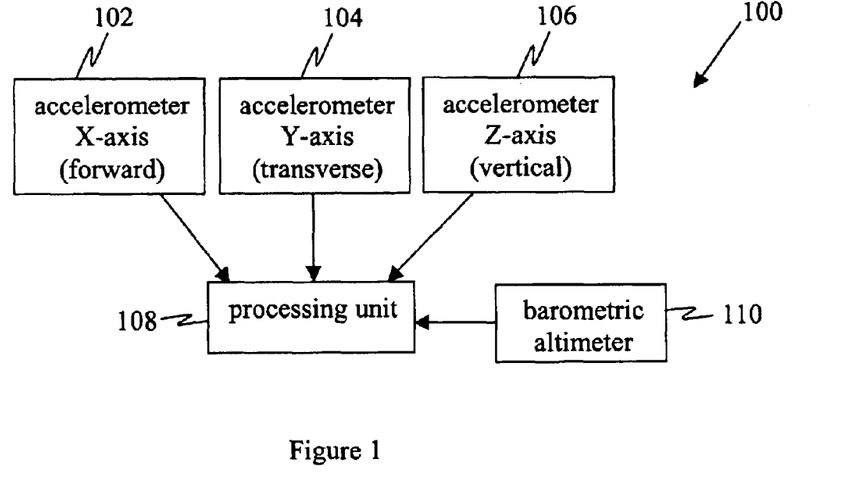
FIG. 1 is a block diagram illustrating a dead reckoning navigation device according to an embodiment of the invention.

FIG. 1 is a block diagram illustrating a dead reckoning navigation device 100 according to an embodiment of the invention. Three accelerometers are employed, with sensitive axes oriented horizontally in the direction of normal walking (forward) 102, horizontally perpendicular to the forward direction (transverse) 104, and vertically 106, respectively. Each accelerometer produces an electrical signal proportional to the acceleration being experienced along its axis. The accelerometers 102, 104, and 106 are communicatively coupled to a processing unit 108 that has timing capabilities which can be used to measure elapsed time intervals. In one implementation of the invention, a barometric altimeter 110 permits measuring changes in elevation during relatively brief intervals.

According to one implementation of the invention, the navigation device 100 is design to mount the accelerometers on, around, or near the user's trunk or waist and above the legs.

A nominal or average stride length that represents the user's stride under normal walking conditions is determined for the particular user by means not a part of this invention and supplied to the processing unit 108. There are two stride parameters referenced in this invention. The nominal or average stride and a modified stride used to calculate distance traveled for a particular step. According to one aspect of the invention, ratios are applied by the processing unit to adjust stride length on a step-by-step basis. That is, the processing unit deduces the type of step that has been taken by a user and applies a scaling multiplier to estimate the correct distance traveled.

According to an embodiment of the invention, the grade or slope of the terrain being walked on can be determined by dividing the change in elevation, as measured by the barometric altimeter 110, by the number of steps to accomplish the elevation change multiplied by the nominal stride. This calculation may be used to select a ratio by which to, for example, reduce the nominal stride for dead reckoning calculations when walking uphill or increase the nominal stride when walking downhill.

According to an embodiment of the invention, accelerometer signals are subjected to high-pass filtering to remove frequencies which do not contain useful information and might interfere with processing, and also low-pass filtering to remove the constant portion of the acceleration of gravity. Although the acceleration of gravity is constant, its component parallel to a particular accelerometer axis may be changed by rotations during walking. These changes are not filtered out. These two filtering processes are equivalent to a band-pass filter which is relatively wide. That is, the ratio of upper cutoff frequency to lower cutoff frequency is large. For the remainder of this description of the invention, "accelerometer signal" shall refer to a signal filtered as described herein. However, unfiltered signals may also be use without deviating from the invention.

The filtered signal from the vertical accelerometer 106 is processed to identify the instance of a footstep. One method for doing this is to recognize a maximum (peak) acceleration by the fact that accelerations decline afterwards. Another method is to respond to a "zero-crossing," a moment when the direction of acceleration reverses. Because the signal from the vertical accelerometer is subject to bandpass filtering, and the DC component has been removed, there is always at least one zero-crossing per step. Since there can be multiple peaks as well as zero crossings per step, some form of reset mechanism is needed to assure that only the first event is recognized. In identifying peaks, a zero crossing can be required before another peak is recognized. Similarly another peak may be required to enable recognizing another zero crossing. It is not necessary that this detection occur at some specific point during the sequence of a step, but it may occur at the same point during each step so that the interval between two successive steps is a useful measure of the time required to complete the step.

Figure 2:
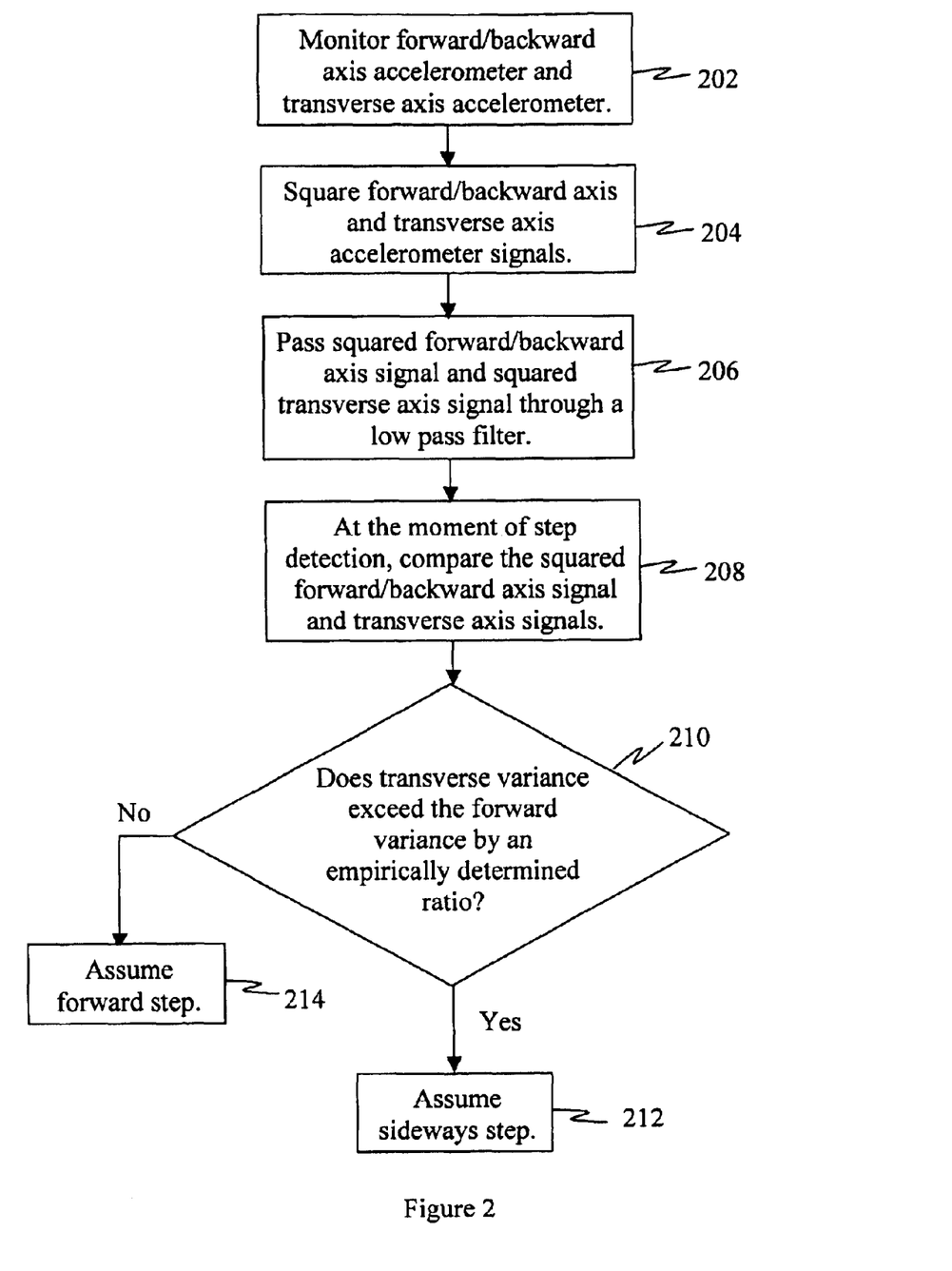
FIG. 2 is a flow diagram illustrating a method for determining the occurrence of sideways or transverse steps according to one aspect of an embodiment of the invention.

FIG. 2 is a flow diagram illustrating a method for determining the occurrence of sideways steps according to one embodiment of the invention. A sideways step can be deduced through an analysis of the forward acceleration 102 and transverse acceleration 104. The forward axis accelerometer 102 and transverse axis accelerometer 104 are monitored 202, for example, by the processing unit 108. Each acceleration signal is squared 204 to produce a variance which is then passed through a low-pass filter 206. During the step, the two filtered variances are compared 208. If the transverse variance exceeds a threshold determined by applying an empirically-determined scale factor to the forward variance, a sideways step is deduced. Otherwise, a forward step is assumed 214.

Figure 3:
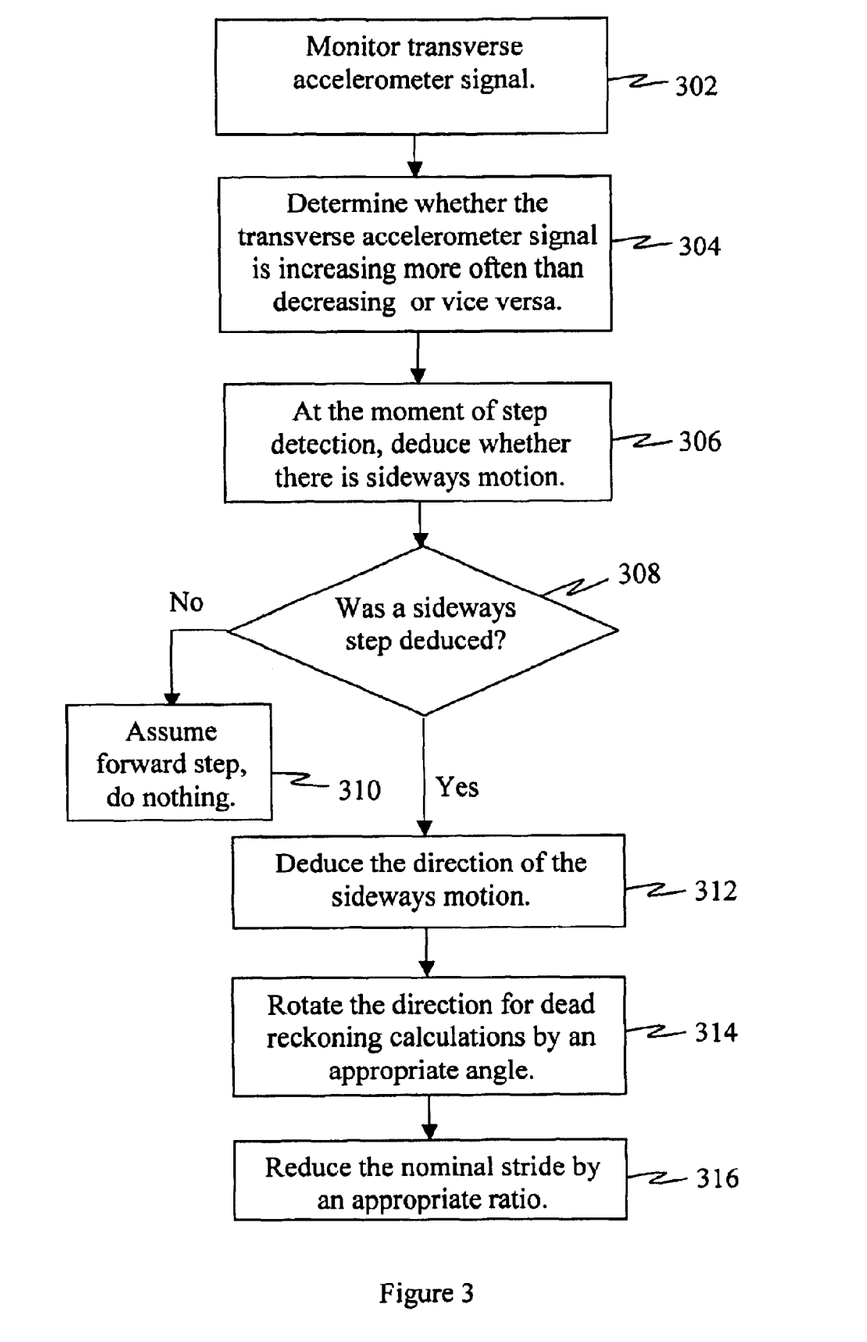
FIG. 3 is a flow diagram illustrating a method for determining the direction of a transverse or sideways step according to one embodiment of the invention.

FIG. 3 is a flow diagram illustrating a method for determining the direction of a transverse or sideways step according to one embodiment of the invention. The transverse accelerometer signal is continuously monitored 302 to track whether if is increasing more often than decreasing, or vice versa 304. When walking sideways toward the right, a person's acceleration is rightward for a longer portion of the step than it is leftward. The leftward acceleration may have a greater magnitude, but it occurs during a shorter proportion of the step. Correspondingly, leftward acceleration dominates when moving leftward. Consequently, the transverse accelerometer signal is continuously monitored 302 to track whether it is increasing more often than decreasing or vice versa 304. In one implementation, this is done by creating a signal which has a positive but constant value when the acceleration is increasing, and a constant negative value of the same magnitude when decreasing. After suitable low-pass filtering, this signal can be used to determine whether the motion was in the direction of positive acceleration (as determined by the properties of the accelerometer) or the other direction. Note that this determination of sideways motion may be done as described in the preceding paragraph.

At the moment of step detection deduce whether there was a sideways step 306, 308. If no sideways step is detected, then do nothing 310. Otherwise, if a sideways step is detected, the filtered signal may be used to determine whether the step is rightward or leftward 312.

If a sideways step is deduced, the direction of travel for dead reckoning calculations is rotated one-quarter turn in the appropriate direction, i.e., ninety (90) degrees, 314 and the nominal stride length is reduced by an empirically-determined ratio 316.

Figure 4:
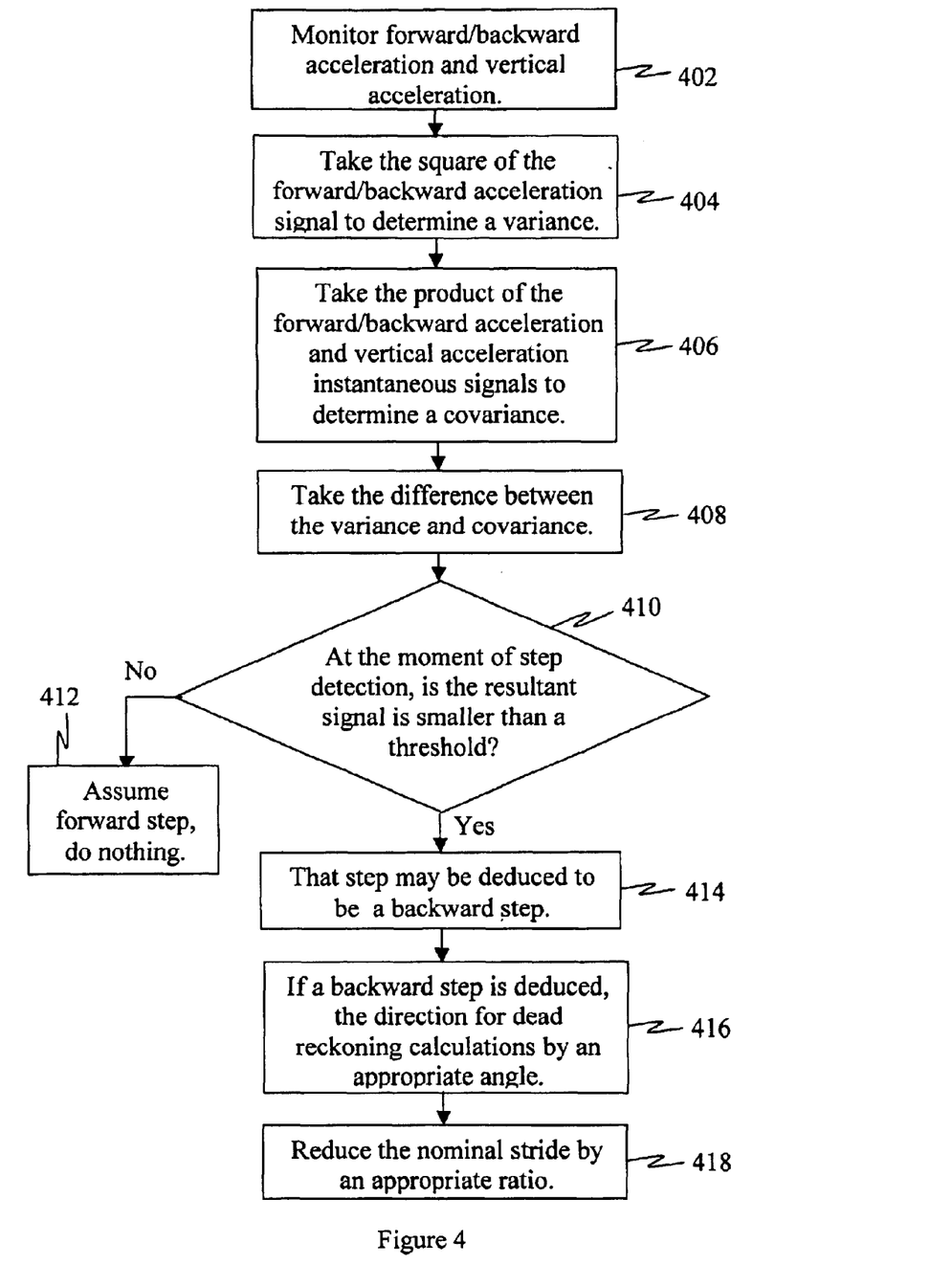
FIG. 4 is a block diagram illustrating a method for utilizing the correlation between the square of the forward acceleration and the product of forward and vertical accelerations to deduce forward versus backward motion.

FIG. 4 is a block diagram illustrating a method for utilizing the correlation between the square of the forward acceleration and the product of forward and vertical accelerations to deduce forward versus backward motion. A significant correlation has been observed between the square of the forward acceleration (variance) and the product of forward and vertical accelerations (covariance) when a user is walking forward. This correlation is much weaker when walking backwards and is the basis for deducing backwards walking. This correlation may be employed by monitoring the forward and vertical accelerations to obtain instantaneous values for each signal 402. A forward variance is calculated by taking the square of the forward acceleration signal 404. A covariance is calculated by taking the product of the forward acceleration and vertical acceleration signals 406. The instantaneous arithmetic difference between forward variance and forward-vertical covariance is then calculated 408. In one implementation, the result of this calculation (variance minus covariance) may be subjected to low-pass filtering as described for variances above. If at the moment of step detection the resultant signal is smaller than a threshold 410, implying little correlation, the step may be deduced to be backwards 414. Otherwise, a forward step may be deduced 412.

According to one implementation of the invention, a step is deduced to be backward only if it is not first determined to be sideways, and the correlation described in the preceding paragraph is smaller than a threshold. If a backward step is deduced 410, 414, the direction for dead reckoning calculations is reversed 416, and the nominal stride length is reduced by an empirically-determined ratio 418.

Figure 5:
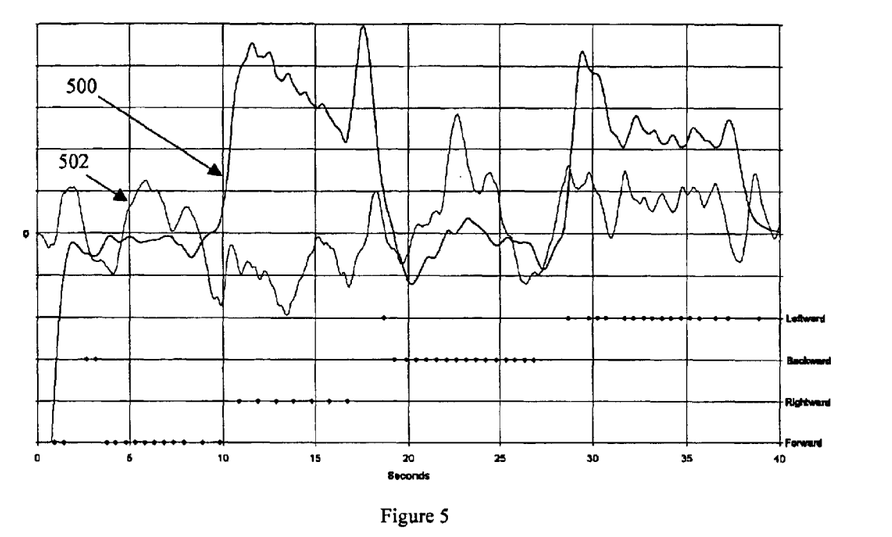
FIGS. 5 and 6 are graphs illustrating accelerations and deduced directions according to one implementation of the invention.
Figure 6:
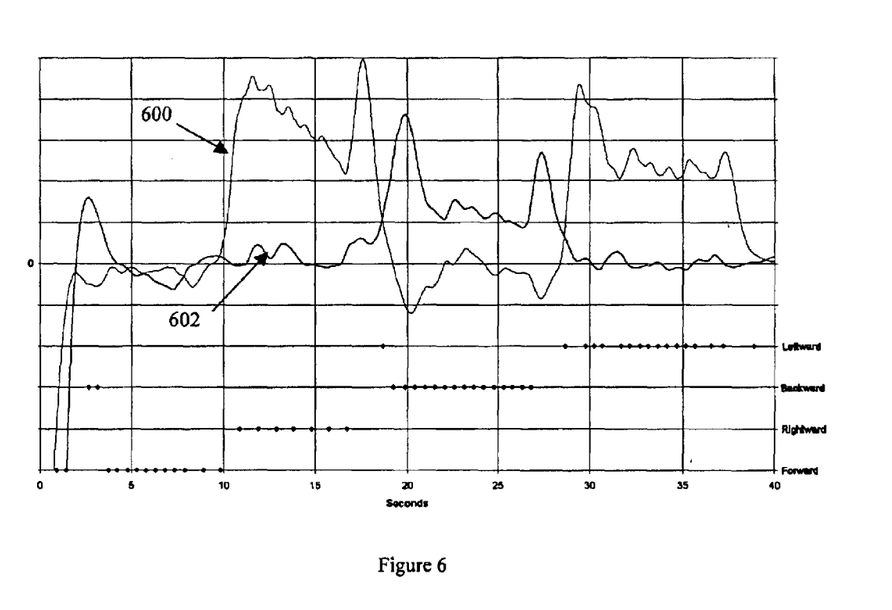

FIGS. 5 and 6 are graphs illustrating accelerations and deduced directions from an actual test according to one implementation of the invention. FIG. 5 illustrates the recognition of sideways walking and, additionally, whether it is toward the left or right. FIG. 6 pertains to recognizing backward walking. Both figures are from the same data, which is a recording walking forward (seconds 0 through 10, approximately), then sideways toward the right (seconds 10 through 20), then backwards (seconds 20 through 28) then sideways toward the left (seconds 28 through the end).

Three accelerometers were used to collect data. The signals from each of the three accelerometers is subjected to bandpass filtering to remove the DC component and extraneous peaks. After filtering, the signals from each of the two horizontal accelerometers are squared, to create the forward and rightward variances. These variance signals are then subjected to additional low-pass filtering. Additionally, the bandpass-filtered output of the transverse accelerometer is converted to one of two levels, a constant positive value if the acceleration had increased since the previous sampling, or a negative value of the same magnitude if the acceleration had decreased. This modified signal is then subjected to low-pass filtering. This method may be implemented by counting, separately, the number of samples during which the acceleration increases, and the number of samples during which it decreases, since the previous step.

In FIG. 5, the difference between the low-pass filtered forward variance and the corresponding sideways variance is illustrated as the area between forward variance trace 500, and the quantized and filtered sideways (rightward/leftward acceleration) trace 502. Each dot represents the moment that a step (Forward, Rightward, Backward, and Leftward) is determined as described elsewhere. In addition, each dot indicates the direction (Forward, Rightward, Backward, and Leftward) of that step as determined by the methods described here. The amount by which sideways (rightward and/or leftward) variance (trace 502) exceeds the forward/backward variance (trace 500) when walking sideways is illustrated by the difference between trace 502 and trace 500. When walking sideways, and only when walking sideways, the quantized and filtered sideways acceleration can be used to determine whether the step is towards the left or the right, as is apparent from trace 502 with the acceleration below the zero line for rightward movement and above the zero line for leftward movement.

In one implementation, an additional signal is generated from the bandpass-filtered accelerations. The signals from the forward/backward and vertical accelerometers are added and then multiplied by the forward/backward acceleration. This is then subjected to low-pass filtering. FIG. 6 illustrates this filtered signal as trace 602. This filtered signal 602 is then used to distinguish between forward walking and backward walking but only when it is determined that the subject is not walking sideways. The difference between sideways and forward/backward variances is also shown in this figure as trace 600. When this difference is large, as it is when walking sideways, the signal shown in trace 602 is ignored.

There are four distinct periods of stepping, and they are, in order, forward, rightward, backward, and leftward. As seen in the FIGS. 5 and 6, three of the fifty-four steps (at around the 2, 3, and 18 second marks) are classified as erroneous, and it is significant that these errors occur at the beginning or end of a series of steps.

Mounting offset of the compass on the user's body would interfere with the processing since, when there is a significant offset, the accelerometer configured to be forward does not actually face forward, and the same is true of that configured to be rightward. If the device is mounted on the user such that it does not face perfectly forward as intended, this offset will distort the accelerations experienced by the forward/backward and transverse accelerometers, and this can invalidate the methods of the invention. It is necessary to determine and correct for such an offset. The offset if left uncompensated would compromise the generality of the advanced pedometry algorithms. Even fairly small body offsets can disrupt the validity of the various algorithms enough to increase erroneous identifications.

By applying a coordinate transformation, the forward and rightward acceleration signals are rotated exactly by the current body offset. This produces the best results possible provided that the value for body offset is correct.

Figure 7:
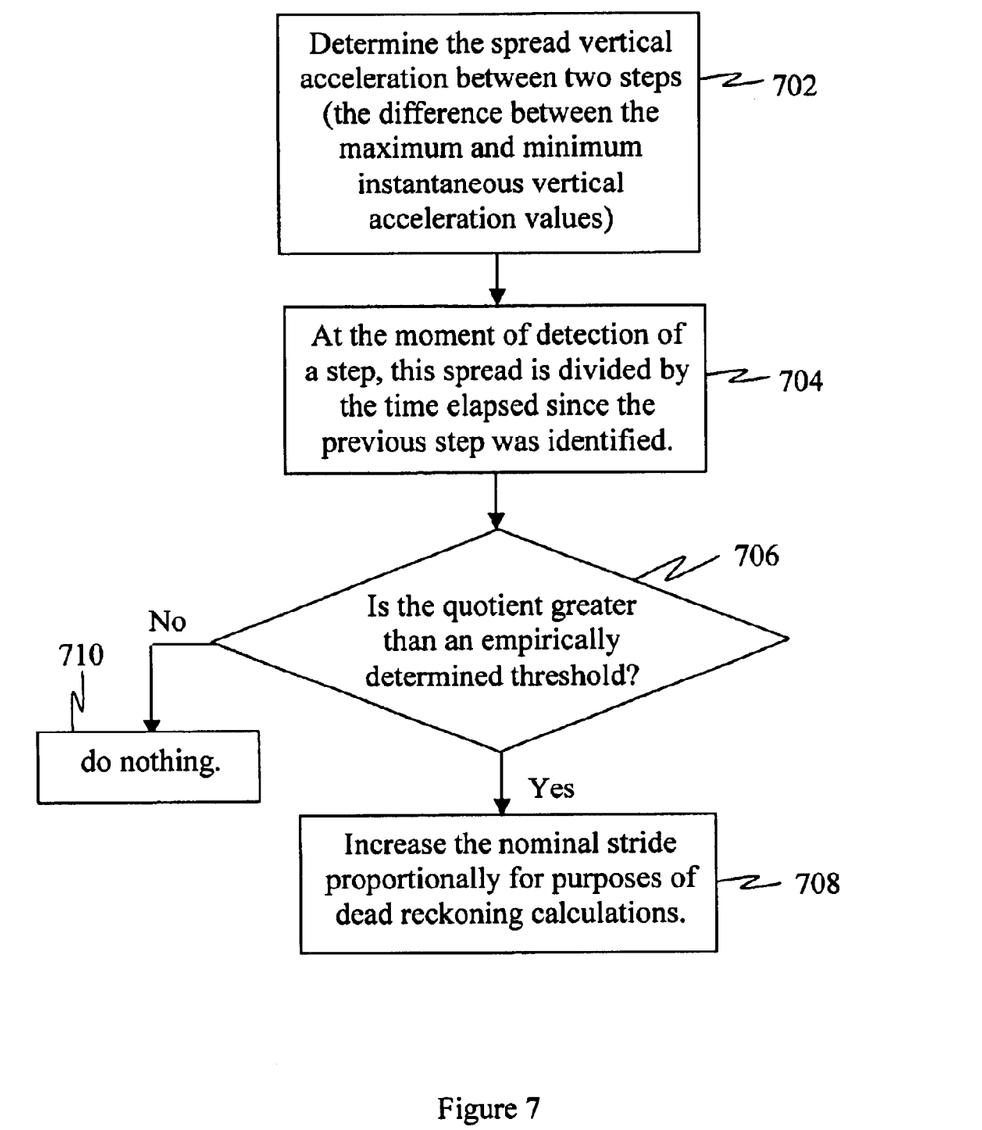
FIG. 7 is a flow diagram illustrating a method for invention distinguishes between running or jogging versus walking according to one aspect an embodiment of the invention.

FIG. 7 is a flow diagram illustrating a method for invention distinguishes between running or jogging versus walking according to one aspect an embodiment of the invention. Running or jogging may be deduced by estimating the amount of energy expended by the user to make the step. This may be accomplished by noting the "spread" of vertical acceleration, defined as the arithmetic difference between the maximum and minimum instantaneous vertical acceleration values, since the last step was identified 702. At the moment of detection of a step, this spread is divided by the time elapsed since the previous step was identified 704. If this quotient is greater than an empirically determined threshold 706, the nominal stride is increased proportionally for purposes of dead reckoning calculations 708. Otherwise do nothing 710.

In one implementation, whenever a sideways or backward step is detected, the dead reckoning update is done with a reduced stride as well as a rotated heading.

The maximum and minimum of the band-pass-filtered vertical acceleration is maintained on a step-to-step basis. At the moment a step is detected, the difference between the maximum and minimum accelerations since the previous step is divided by the elapsed time since that step.

The result is a "step energy estimate" which, if it exceeds a certain threshold, is used to increase the length of the stride for that step. This increase is proportional to the amount by which the energy estimate exceeds the threshold and is limited to doubling the stride at another, higher, predetermined value. The threshold distinguishes between walking and running. The difference between the doubling point and the threshold controls the amount of stride extension. Doubling the stride length has been determined to be adequate to describe a running stride for a person. In other implementations, other multiplier factors may be used without departing from the invention.

Figure 8:
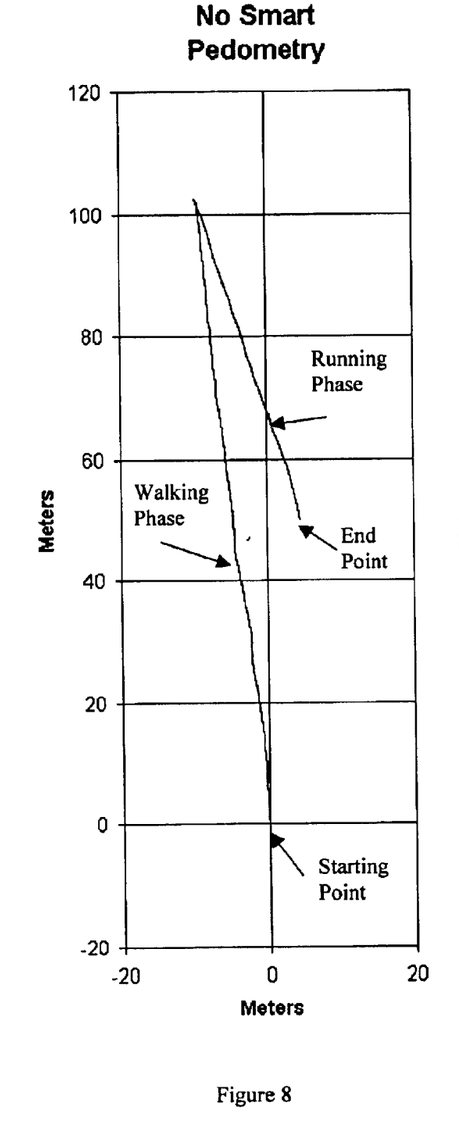
FIGS. 8 and 9 are trajectory graphs illustrating the difference in navigation with and without a running compensation algorithm.
Figure 9:
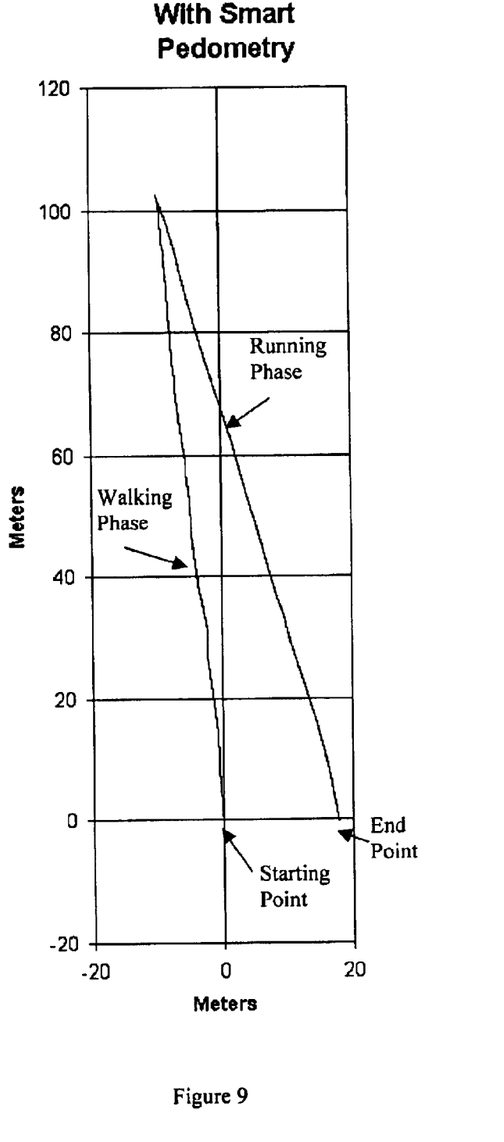

FIGS. 8 and 9 are trajectory graphs illustrating the difference in navigation with and without a running compensation algorithm. FIGS. 8 and 9 show dead reckoning tracks with (FIG. 9) and without (FIG. 8) the running compensation algorithm of a test in which the subject walked north for one hundred (100) meters, then ran back to the starting point. The figures actually show the data for a single trial in which both sets of data, with and without a running compensation algorithm, were calculated and recorded simultaneously. The subject took one hundred twenty-nine (129) steps walking northward but needed only sixty-eight (68) steps to run back. As shown in FIG. 8, the pedometer without running compensation had a greater error in tracking the position of the user during the running phase. Thus, the increased accuracy of using a running compensation algorithm can be verified.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Additionally, it is possible to implement embodiments of the invention or some of their features in hardware, programmable devices, firmware, software or a combination thereof. The invention or parts of the invention may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile). Therefore, it is to be understood that, within the scope of the appended claims, the invention may be practiced other than as specifically described herein.

What is claimed is:

1. A device comprising:
   one or more acceleration measuring transducers to be positioned around a user's torso to detect the user's movement in one or more axes, at least one of the acceleration measuring transducers to provide an output signal corresponding to motion along one axis;
   an altimeter to detect changes in altitude and provide a corresponding output signal; and
   a processing unit communicatively coupled to the plurality of acceleration measuring transducers and the altimeter, the processing unit to receive one or more signals from the one or more acceleration measuring transducers and the altimeter and generate navigation information, wherein the processing unit is configured to determine the slope of motion by
   determining a number of steps taken by the user,
   determining a horizontal distance traveled by multiplying the number of steps by a nominal stride length,
   determining a change in elevation from the altimeter signal, and
   dividing the change in elevation by the horizontal distance traveled.

2. The device of claim 1 wherein the processing unit is configured to use the one or more acceleration signals and altimeter signal to
   determine a nominal stride length,
   deduce a type of step taken by a user,
   determine a scaling multiplier for the deduced type of step, and
   apply the scaling multiplier to the nominal stride length to estimate the correct distance traveled.

3. The device of claim 1 wherein the processing unit is configured to use the slope information select a scaling multiplier to adjust the nominal stride length for purposes of accurately calculating distance traveled.

4. The device of claim 1 further comprising:
   one or more magnetometers capable of sensing the earth's magnetic field, at least one magnetometer communicatively coupled to the processing unit to provide a signal corresponding to the direction of earth's magnetic field.

5. The device of claim 1 wherein the processing unit is configured to
   determine acceleration changes over time from the one or more acceleration signals to determine an approximate direction of motion.

6. The device of claim 1 wherein the processing unit is configured to distinguish a either a forward or backward step movement from a sideways step movement.

7. The device of claim 1 wherein the one or more acceleration measuring transducers include
   a transverse axis accelerometer positioned approximately perpendicular to the forward direction of motion and providing a transverse acceleration signal, and
   wherein the processing unit is configured to distinguish the direction of a sideways step motion by monitoring characteristics of the transverse acceleration signal.

8. The device of claim 1 wherein the processing unit is configured to identify a running motion and adjust a nominal stride length to accurately account for distance traveled.

9. The device of claim 1 wherein the processing unit is configured to distinguish a forward step movement from a backward step movement based on the signals from the one or more acceleration measuring transducers.

10. A device comprising:
    one or more acceleration measuring transducers to be positioned around a user's torso to detect the user's movement in one or more axes, at least one of the acceleration measuring transducers to provide an output signal corresponding to motion along one axis, the one or more acceleration measuring transducers include
    a forward/backward axis accelerometer providing a forward/backward acceleration signal,
    a transverse axis accelerometer positioned approximately perpendicular to the forward/backward axis accelerometer and providing a transverse acceleration signal;
    an altimeter to detect changes in altitude and provide a corresponding output signal; and
    a processing unit communicatively coupled to the plurality of acceleration measuring transducers and the altimeter, the processing unit to receive one or more signals from the one or more acceleration measuring transducers and the altimeter and generate navigation information, wherein the processing unit is configured to distinguish between a forward or backward step movement from a sideways step movement by calculating the square of the forward/backward acceleration signal to generate a variance, calculating the square of the transverse acceleration signal to generate a variance, calculating a covariance by multiplying the forward/backward acceleration signal by the vertical acceleration signal, testing for correlation by multiplying the forward/backward-vertical covariance by the forward/backward variance, determining a frequency of the walking steps for a user, passing the variances and variance/covariance product through a low-pass filter with a cut-off frequency approximately the frequency of walking steps for a user, comparing the filtered forward/backward and transverse variances at a moment of step detection, and if the transverse covariance exceeds the forward/backward variance by a pre-determined ratio, a sideways step is assumed, otherwise, if the variance/covariance product exceeds a threshold, a forward step is assumed, otherwise a backward step is assumed.

11. A device comprising:

one or more acceleration measuring transducers to be positioned around a user's torso to detect the user's movement in one or more axes, at least one of the acceleration measuring transducers to provide an output signal corresponding to motion along one axis, the one or more acceleration measuring transducers include a vertical axis accelerometer providing a vertical acceleration signal;

an altimeter to detect changes in altitude and provide a corresponding output signal; and a processing unit communicatively coupled to the plurality of acceleration measuring transducers and the altimeter, the processing unit to receive one or more signals from the one or more acceleration measuring transducers and the altimeter and generate navigation information, wherein the processing unit is configured to compensate for a running motion by determining a difference between a maximum and minimum instantaneous vertical acceleration values within a most recent one step cycle, dividing this difference by the time elapsed over the most recent one step cycle, and if the quotient is greater than a threshold, a running motion is assumed and the nominal stride length is increased proportionally for purposes of dead reckoning calculations.

12. A device comprising:

one or more acceleration measuring transducers to be positioned around a user's torso to detect the user's movement in one or more axes, at least one of the acceleration measuring transducers to provide an output signal corresponding to motion along one axis, the one or more acceleration measuring transducers include a forward/backward axis accelerometer providing an instantaneous forward/backward acceleration signal, and a vertical axis accelerometer providing an instantaneous vertical acceleration signal;

an altimeter to detect changes in altitude and provide a corresponding output signal; and a processing unit communicatively coupled to the plurality of acceleration measuring transducers and the altimeter, the processing unit to receive one or more signals from the one or more acceleration measuring transducers and the altimeter and generate navigation information, wherein the processing unit is configured to distinguish a forward step movement from a backward step movement by calculating a variance by taking the square of the forward acceleration signal, calculating a covariance by taking the product of the forward acceleration signal and the vertical acceleration signal, calculating the instantaneous arithmetic difference between forward variance and forward-vertical covariance, if, at the moment a step is detected, the difference is smaller than a threshold, the step is assumed to be a backward step, otherwise, a forward step is assumed.

13. A method for navigating on foot comprising:

monitoring one or more acceleration sensors arranged mounted at a user's torso to measure acceleration along different axes; and analyzing the acceleration changes over time to determine an approximate direction of movement with respect to a first direction determining the slope of motion by determining a number of steps taken by the user, determining a horizontal distance traveled by multiplying the number of steps by a nominal stride length, determining a change in elevation from an altimeter output signal, and dividing the change in elevation by the horizontal distance traveled.

14. The method of claim 13 further comprising:

measuring acceleration changes over time to determine the approximate change in distance between the user's steps due to a running step versus a walking step.

15. The method of claim 13 further comprising:

estimating the distance traveled between user steps based on the approximate direction of motion relative to a heading and slope.

16. A method comprising:

monitoring one or more accelerometers aligned along one or more axis;

generating a signal corresponding to the acceleration sensed along the corresponding axis;

monitoring an altimeter for an elevation signal;

deducing a type of step taken by a user, based on one or more of the acceleration signals;

determining a stride scaling multiplier for the deduced type of step;

scaling the nominal stride length with the scaling multiplier to estimate the correct distance traveled;

determining the number of steps taken by the user;

determining the horizontal distance traveled by multiplying the number of steps by a nominal stride length;

determining a change in elevation from the altimeter signal; and dividing the change in elevation by the horizontal distance traveled to obtain the slope of the terrain traveled.

17. A method to distinguish between a forward step and a sideways step comprising:

monitoring a forward acceleration signal;

monitoring a transverse acceleration signal, the transverse acceleration direction being perpendicular to the forward acceleration direction;

calculating the square of the forward/backward acceleration signal to generate a variance;

calculating the square of the transverse acceleration signal to generate a variance;

calculating the product of the forward/backward acceleration and the vertical acceleration to generate a covariance;

determining a frequency of the forward walking steps for a user;

passing the variances and covariance through low-pass filters with a cut-off frequency approximately the frequency of forward walking steps for a user;

comparing the filtered forward/backward variance and transverse variances at a moment of step detection; and assuming a sideways step if the transverse variance exceeds the forward/backward variance by a ratio.

18. A method for distinguishing between right and left directions of a user's travel, comprising:

monitoring a forward/backward acceleration signal indicating a forward/backward acceleration direction;

monitoring a transverse acceleration signal indicating a transverse acceleration direction, the transverse acceleration direction being perpendicular to the forward/backward acceleration direction;

calculating the square of the forward/backward acceleration signal to generate a variance;

calculating the square of the transverse acceleration signal to generate a variance;

calculating a covariance by multiplying the forward/backward acceleration signal by the vertical acceleration signal;

testing for correlation by multiplying the forward/backward-vertical covariance by the forward/backward variance;

determining a frequency of the walking steps for the user;

passing the variances and variance/covariance product through a low-pass filter with a cut-off frequency approximately the frequency of walking steps for the user, comparing the filtered forward/backward and transverse variances at a moment of step detection, and if the transverse covariance exceeds the forward/backward variance by a pre-determined ratio, a sideways step is assumed, otherwise, if the variance/covariance product exceeds a threshold, a forward step is assumed, otherwise a backward step is assumed; and distinguish the direction of a sideways step motion by monitoring characteristics of the transverse acceleration signal.

19. A method for estimating distance traveled on foot, comprising:

identifying a running motion by
monitoring vertical acceleration,
determining a difference between a maximum and minimum instantaneous vertical acceleration values within a most recent one step cycle,
dividing this difference by the time elapsed over the most recent one step cycle; and if the quotient is greater than a threshold, adjusting a nominal stride length to accurately account for distance traveled by multiplying the nominal stride length by a proportional scaling multiplier to accurately account for the distance traveled.

20. A method for distinguishing between forward steps and backward steps, comprising:

monitoring a forward/backward axis accelerometer;

monitoring a vertical axis accelerometer;

calculating a variance by taking the square of a forward/backward acceleration signal;

calculating a covariance by taking the product of the forward/backward acceleration signal and a vertical acceleration signal;

determining the product of the forward/backward variance and the forward/backward-vertical covariance;

assuming a backward step if, at the moment a step is detected, the product is smaller than a threshold; and otherwise, assuming a forward step.

* * * * *